(12) United States Patent
Sellars et al.

(10) Patent No.: US 9,927,233 B2
(45) Date of Patent: Mar. 27, 2018

(54) COATING THICKNESS MEASURING INSTRUMENT AND METHODS

(71) Applicants: Michael Carrington Sellars, Manchester (GB); Joseph J. Walker, Rochester Hills, MI (US)

(72) Inventors: Michael Carrington Sellars, Manchester (GB); Joseph J. Walker, Rochester Hills, MI (US)

(73) Assignee: Elcometer Limited, Manchester (GB)

( * ) Notice: Subject to any disclaimer, the term of this patent is extended or adjusted under 35 U.S.C. 154(b) by 915 days.

(21) Appl. No.: 13/738,809

(22) Filed: Jan. 10, 2013

(65) Prior Publication Data

US 2014/0195187 A1 Jul. 10, 2014

(51) Int. Cl.
*G01B 21/08* (2006.01)
*G06F 17/00* (2006.01)
*G01B 17/02* (2006.01)

(52) U.S. Cl.
CPC ........... *G01B 21/08* (2013.01); *G01B 17/025* (2013.01); *G06F 17/00* (2013.01)

(58) Field of Classification Search
None
See application file for complete search history.

(56) References Cited

U.S. PATENT DOCUMENTS

| 5,418,823 | A | 5/1995 | Kervinen et al. |
| 6,243,661 | B1 | 6/2001 | Baldwin et al. |
| 6,529,014 | B1 | 3/2003 | Nix |
| 7,352,194 | B1 | 4/2008 | Fuente Souviron et al. |
| 2003/0038628 | A1 | 2/2003 | Nath et al. |
| 2003/0057100 | A1* | 3/2003 | Wang ............... C25D 11/16 205/328 |
| 2008/0208524 | A1* | 8/2008 | Sellars ............... G01B 7/281 702/168 |

(Continued)

FOREIGN PATENT DOCUMENTS

GB 9700305.7 A 5/1997

OTHER PUBLICATIONS

System Fischer, The Smart Way to Measure Coating Thickness, Printed in Germany Jun. 2005, © Helmut Fischer GmbH+Co.KG, p. 1-14.*

(Continued)

*Primary Examiner* — Tung Lau
(74) *Attorney, Agent, or Firm* — Leydig, Voit & Mayer, LTD

(57) ABSTRACT

A coating thickness measuring instrument has a probe for measuring the thickness of a coating applied to a substrate and producing an output relating to the measured thickness; a memory storing calibration data; and a processor arranged to process the output produced by the probe, together with calibration data stored by the memory, and produce a coating thickness measurement. The memory stores at least two sets of calibration data, each set associated with a different surface profile value and a user may select the set of calibration data to be used by the processor according to the surface profile of the substrate on which a measurement is to be made. This enables a user to make coating thickness measurements on substrates with at least two different, known, surface profiles without having to calibrate the instrument specifically for those surfaces.

15 Claims, 3 Drawing Sheets

(56) References Cited

U.S. PATENT DOCUMENTS

2015/0233697 A1* 8/2015 Sellars .................... G01B 7/06
702/97

OTHER PUBLICATIONS

Roughness—definition of roughness by The Free Dictionary, printed on Jul. 15, 2015, 4 pages,—http://www.thefreedictionary.com/roughness.*
Designation: E 376-96, Published Feb. 1997, 4 pages.*

* cited by examiner

COATING THICKNESS MEASURING INSTRUMENT AND METHODS

TECHNICAL FIELD

The present disclosure relates to a coating thickness measuring instrument, to a method of providing a coating thickness measurement instrument, and to a method of measuring the thickness of a coating on a substrate, the substrate having a known surface profile.

BACKGROUND

Conventional coating thickness measuring instruments comprise an electromagnetic probe. A tip of the probe is placed in contact with the surface of a coating on a substrate. The instrument determines the distance between the probe tip and the substrate, and thereby measures the thickness of the coating.

To enable accurate measurements to be made it is necessary for an instrument to be calibrated prior to use. This is achieved by placing calibration foils of various known thicknesses onto an uncoated region of a substrate on which coating thickness is to be measured, or a sample of an equivalent substrate, and placing the probe onto the foils and taking readings. Alternatively measurements of test coatings of known thickness may be made. The resulting information is used to generate an appropriate calibration curve to calibrate subsequent measurements of coating thickness taken on the substrate or an equivalent substrate. The calibration curve is stored by the instrument as calibration data.

To ensure accuracy it is necessary to recalibrate the instrument for each substrate or type of substrate on which measurements are to be made. Changes in characteristics of a substrate can have a significant effect on measurements taken by an instrument. The need to calibrate and recalibrate can be inconvenient and time consuming. In some circumstances an appropriate sample of an uncoated substrate is not available to enable the instrument to be calibrated. The present invention addresses these problems.

It has been found that readings taken by a coating thickness measuring instrument over a substrate are significantly affected by the profile (surface roughness) of the substrate.

SUMMARY

According to an aspect of the present disclosure there is provided a coating thickness measuring instrument comprising:
a probe for measuring the thickness of a coating applied to a substrate and producing an output relating to the measured thickness;
a memory storing calibration data;
a processor arranged to process the output produced by the probe, together with calibration data stored by the memory, to produce a calibrated coating thickness measurement; and
wherein the memory stores at least two sets of calibration data, each set associated with a different surface profile value, and a user may select the set of calibration data to be used by the processor according to the surface profile of the substrate on which a measurement is to be made.

Thus, the instrument is pre-calibrated to at least two differently profiled surfaces and a user can select the appropriate calibration according to the surface profile on which measurements are to be made. This avoids the need for specific calibration or recalibration, and provides for more accurate measurements to be made than might otherwise be the case where an uncoated region of the substrate is not available to enable a substrate specific calibration to be made.

The instrument may store three or more sets of calibration data, each associated with a different surface profile. The sets of calibration data may be stored in a non-volatile memory. This way the data can be derived and stored by an instrument manufacturer or supplier and supplied to an end user without risk of the data being lost, for example due to lack of a power supply.

A user may select a set of calibration data to be used by selecting a surface profile value from a range of values, each value associated with a different set of calibration data.

The probe may be removably mounted to the remainder of the instrument enabling different probes to be used with the instrument. In this case different sets of calibration data need to be stored for each probe which may be used with the instrument. In one embodiment memory comprised in the instrument, other than the probe, stores at least two sets of calibration data, each set associated with a different surface profile, for use in calibration of measurements made by one probe and at least two different sets of calibration data, each set associated with a different surface profile, for use in calibration of measurements made by another probe. Additional data sets may be stored for use with additional probes. In another embodiment the memory storing sets of calibration data is mounted to the probe for removal from the remainder of the instrument with the probe. Thus, each probe is provided with a memory storing probe specific calibration data sets.

According to another aspect of the disclosure there is provided a method of providing a coating thickness measuring instrument comprising the steps of:
providing a coating thickness measuring instrument comprising a probe for measuring the thickness of a coating applied to a substrate and producing an output relating to the measured thickness; a memory for storing at least two different sets of calibration data; and a processor arranged to process the output produced by the probe, together with a set of calibration data stored in the memory and selected by a user, to produce a calibrated coating thickness measurement; and
using the instrument to make a series of calibration measurements on a first substrate with a first surface profile to derive a first set of calibration data and storing the first set of calibration data in the memory; and
using the instrument to make a series of calibration measurements on a second substrate with a second surface profile, different to the first surface profile, to derive a second set of calibration data and storing the second set of calibration data in the memory.

The first and second sets of calibration data may be stored in the memory in association with values corresponding to the average surface profile of the first and second substrate respectively. Each of the first and second substrate may be measured using a surface profile meter, of conventional type (for example a profilometer or roughness meter) to determine their average surface profile. The first and second substrate may be prepared by profiling the surface of a sample of material with a desired surface profile, such as by blasting with blast media, for example shot, grit or sponge.

The method may further comprise the step of delivering the instrument to a user. In certain aspects, storing the sets of calibration data is carried out by a party other than the end user of the instrument (the instrument manufacturer, for example), so the end user is not concerned with calibrating the instrument. Typically calibration data would be stored by the instrument manufacturer in the factory where the instrument is manufactured.

According to a further aspect of the present disclosure there is provided a method of measuring the thickness of a coating on a substrate with a known surface profile comprising the steps of:

providing a coating thickness measuring instrument according to the first aspect of the invention discussed above;

selecting from the surface profile values stored by the instrument in association with sets of calibration data the surface profile value closest to the known surface profile, thereby to select a set of calibration data to be used by the instrument; and using the instrument to measure coating thickness on the substrate.

DETAILED DESCRIPTION

In order that the disclosure may be more clearly understood embodiments thereof will now be described, by way of example only, with reference to the accompanying drawings, of which:

Figure 1:
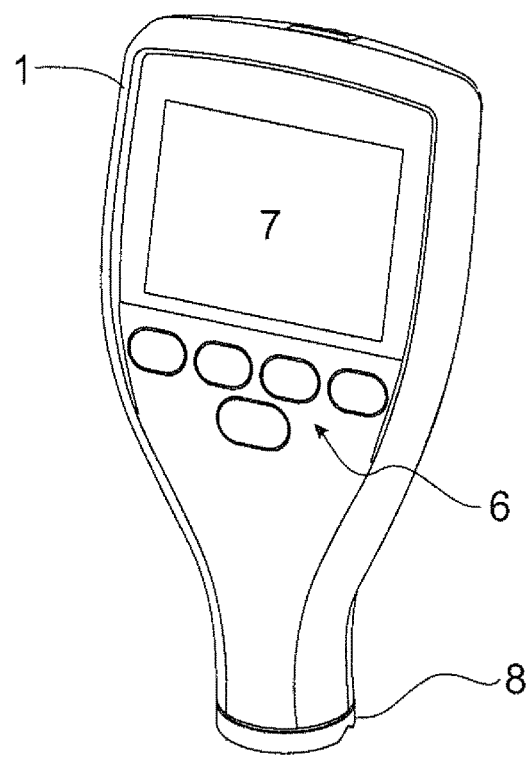
FIG. 1 shows an embodiment of a measuring instrument according to an embodiment.
Figure 2:
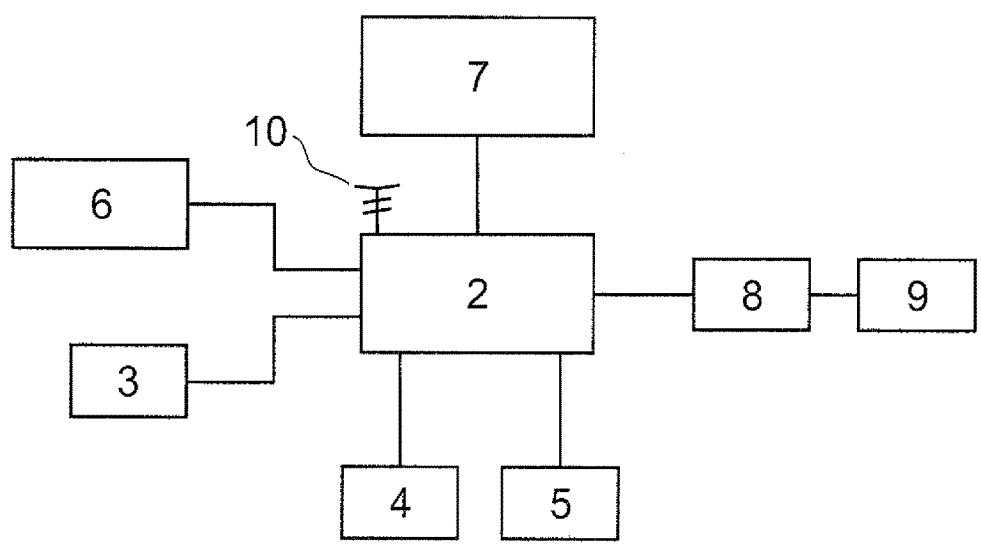
FIG. 2 is a block diagram of components of the instrument of FIG. 1.
Figure 3:
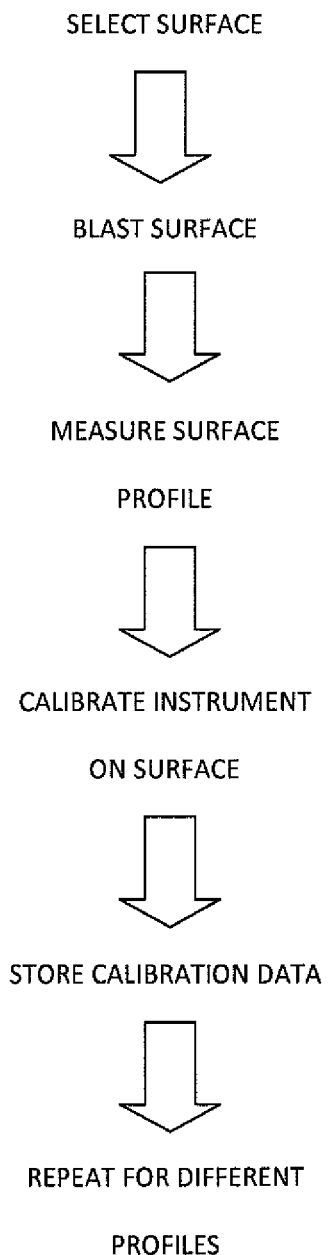
FIG. 3 is a block diagram showing steps involved in storing sets of calibration data in the instrument.

Referring to FIGS. 1 to 3, a coating thickness measuring instrument comprises a body 1. The body houses a programmable processor 2. The processor is connected to a power supply 3, such as an electric battery, and volatile 4 and non-volatile 5 memory all disposed in the housing. The processor 2 is also connected user operable buttons 6, or some other suitable input device, and a display screen 7 mounted on the housing and visible to the exterior of the housing. The processor is also connected to an antenna 10 to enable data to be transmitted wirelessly to or received from another device such as a pc. Alternatively, or additionally, in other embodiments a suitable electrical connection is provided to enable the instrument to be directly connected to another device to enable transfer of data.

The processor is also connected to a probe 8 with an associated non-volatile memory 9. In the embodiment of FIG. 1 the probe is permanently mounted to the body of the instrument. In other embodiments the probe is demountable enabling different types of probe to be fitted to the instrument.

The probe is an electromagnetic probe of known type used to measure the thickness of a coating on a substrate. As with existing coating thickness measuring instruments, the probe is placed into contact with a coating on a substrate. The probe is sensitive to the distance between its tip, in contact with the coating, and the surface of the substrate and the instrument determines this distance and thereby measures the thickness of the coating.

The processor 2 operates by running software stored on the non-volatile memory 5. The volatile memory 4 is used to store information concerning measurements made by the instrument, the calibration of the instrument when the measurements were made, and information input by a user. The non-volatile memory 9 associated with the probe stores information relating to the probe and which may be read and used by the processor 2.

The general operation of instruments of this type is well known to persons of ordinary skill in the relevant field and so will not be described in further detail.

Where this instrument differs over existing instruments is through the provision of pre-stored sets of calibration data associated with substrates with differing surface profiles (roughness) and the way in which these calibration settings are determined, recorded and used. This enables the instrument to be used by a user to take reasonably accurate measurements of coating thickness on profiled substrates, of a known type with a known average surface profile, without the user having to specifically calibrate the instrument to that substrate. This saves time and effort, and increases accuracy where there is no uncoated sample of the substrate on which the user could calibrate the instrument.

Calibration data is generated and stored following the method illustrated in FIG. 3. First, a sample or samples of a material on which it is ultimately intended to make coating thickness measurement is selected. This could, for example be a particular grade of steel.

Then, two or more surfaces of that material are provided. These could be provided on separate samples of the same material, or on separate areas of the same sample of material. They should be substantially flat.

The surfaces are then separately profiled, for example by blasting with appropriate media, such a shot, git or sponge to produce substantially evenly profiled surfaces having different average surface profiles, corresponding to the profile of surfaces on which it is ultimately desired to make coating thickness measurements. The average surface profile of each substrate is then measured using a conventional technique, for example by use of a surface profile meter. If the measured average profile does not correspond to a desired profile it may be necessary to prepare a further sample using a modified technique, and to measure the average surface profile of the further sample. The process can be repeated until a set of two or more profiled surfaces has been generated with desired surface profiles.

When a set of desired profiled surfaces has been prepared, the instrument is calibrated for each surface. This may be achieved using a two point calibration technique. First a foil (typically a plastics material film) of known thickness is placed over the sample surface. The probe 8 of the instrument is placed into contact with the foil, sandwiching the foil between the probe tip and the profiled surface, a thickness measurement is made using the instrument, and the known thickness of the foil is provided to the instrument. The process is then repeated using a foil, or combination of foils, with a different total thickness to the original foil. This enables calibration data to be generated by the instrument appropriate to the surface profile, enabling the instrument to make accurate measurements of coating thickness on the surface. This data, is then stored in non-volatile memory and associated with the measured average surface profile of the sample surface on which the instrument has been calibrated. The data could be stored either in the non-volatile memory 5 of the instrument and/or that 9 associated with the probe 8.

The foil thicknesses should be selected according to end user requirements, so that the instrument is calibrated over a coating thickness range for which it is intended to be used to make measurements. Sets of calibration data could be stored relating to calibration of the instrument at different coating thickness values or ranges over the same surface profile.

Techniques other than the two point calibration technique may be used as appropriate. The two point and other calibration techniques for coating thickness measuring instruments are well known and understood by those skilled in the art.

The instrument is then calibrated on another surface from the prepared set, and calibration data for that surface saved in non-volatile memory and associated with the measured profile of the other surface. The process is then repeated for any other surfaces in the set.

As an alternative, sample profiled surfaces could be prepared and coated with a coating of known thickness to provide a coated reference surface for use in calibrating the instrument, and thus dispense with the need to use foils. Such sample surfaces could have different regions to which different thicknesses of coating have been applied. Appropriate samples could be provided to end users to enable the calibration of a given instrument to be checked.

Whilst not essential, the process of preparing sample surfaces and calibrating the instrument to these surfaces can be carried out by a manufacturer or supplier of the instrument rather than an end user. The sample surfaces on which the instrument is calibrated may be prepared and/or selected at the request of a particular end user of the instrument. The instrument is then shipped to a user with the calibration data sets stored in non-volatile memory.

The instrument is controlled by a user using the various control buttons 6 and via command menus displayed on the screen 7. Again, the general operation of coating thickness instruments of this type is known and understood by those of ordinary skill in the art, who will understand that an instrument must be calibrated appropriately before using it to make measurements, and that this normally requires calibrating the instrument on an uncoated sample of substrate of a type on which measurements are to be made.

Figure 4:
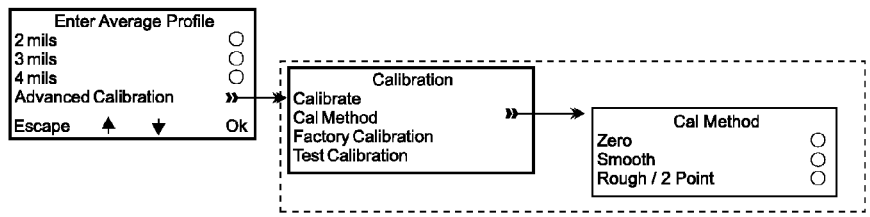
FIG. 4 shows screen views of the instrument of FIG. 1.

With the current instrument though, when the calibration function is selected the user is presented with the screen shown to the left hand side of FIG. 4. This screen is entitled "Enter Average Profile" and prompts the user to select from four choices:

2 mils
3 mils
4 mils
Advanced Calibration

Each of the first three choices causes the instrument to employ pre-stored calibration data relating to measurement over surfaces with average surface profiles of 2, 3, and 4 mils respectively. Thus for measurement of coating thickness over a surface with these profiles, or near to these profiles, a user may select the appropriate one of these modes. The instrument will then use the appropriate pre-stored calibration data to modify thicknesses detected by the probe 8 to produce accurate calibrated measurements.

Clearly the display will list options appropriate to the calibration data stored in the instrument and these could be other than those shown in FIG. 4.

An instrument could be supplied with standard sample coated surfaces with surface profiles corresponding to some or all of the profiles for which the instrument has been calibrated, thus enabling an end user to check the instrument's calibration if required.

By using one of these pre-stored modes it is not necessary for a user to go through a calibration process before taking readings. This saves time and reduces the risk of incorrect calibration through user error. Clearly the accuracy of any measurements taken using a pre-stored calibration setting will depend on how similar the surface over which measurements are taken is to the sample surface on which the instrument was calibrated.

In view of differences in these surfaces, the instrument may be configured to limit the resolution to which it calculates coating thickness when a pre-stored set of calibration data is used, for example to a number of decimal places. Such a limit may be configurable by a user, or it may only be configurable by the manufacturer. A different resolution limit could apply to each set of calibration data, so that a resolution limit appropriate to a calibration data set is employed.

The Advanced Calibration option enables a user to opt to calibrate the instrument in a conventional way using one of three appropriate calibration techniques: zero; smooth and rough/2 point. These are well understood.

Alternatively the user may select a factory calibration setting. In this case a further set of pre-stored calibration data is employed. This is also stored following manufacture of the instrument using measurements taken over a known, typically smooth, test surface.

The instrument enables a user conveniently to take measurements over a predetermined range of differently profiled surfaces without having to calibrate, or recalibrate, the instrument for each surface.

Figure 5:
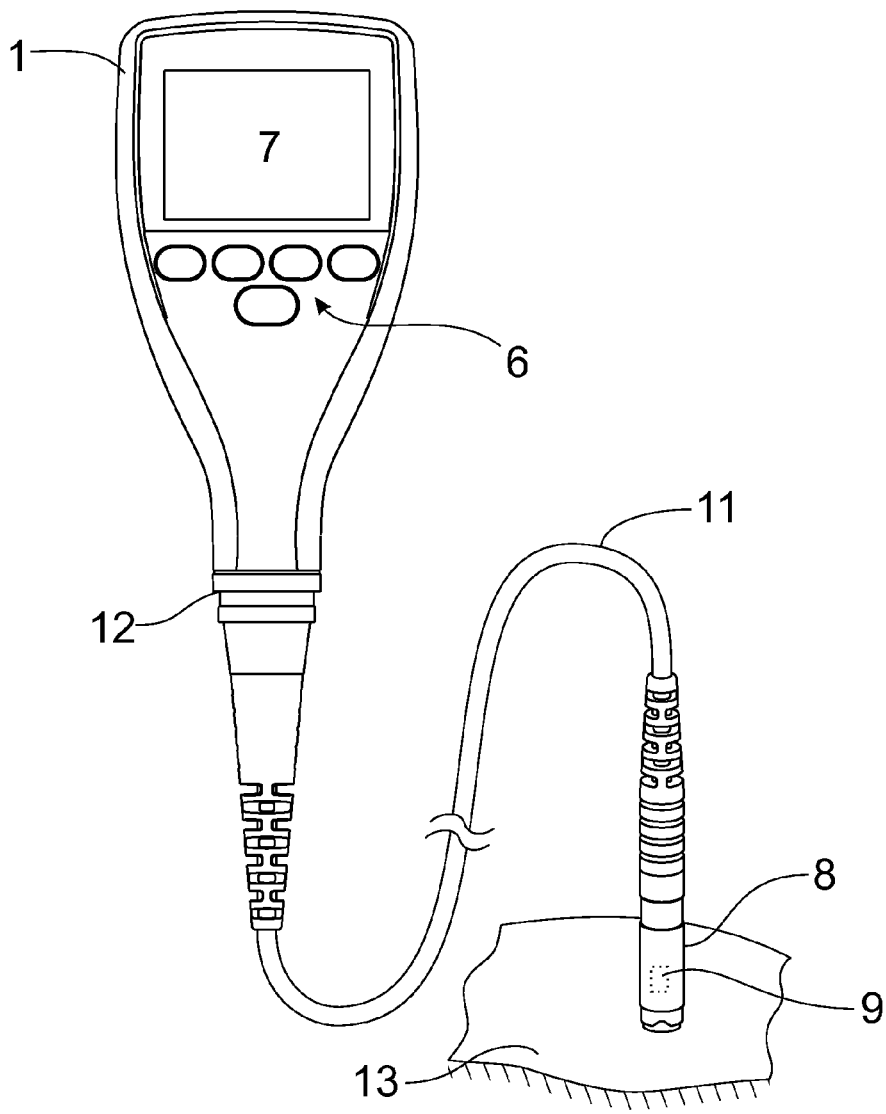
FIG. 5 shows an alternative embodiment of a measuring instrument according to an embodiment.

An alternative embodiment is illustrated in FIG. 5. In this embodiment the probe 8 is attached to the instrument by a cable 11 via an electrical fitting 12. Different probes may be used, as appropriate, with the instrument. The illustrated probe 8 is shown in contact with a substrate 13.

When different probes may be used with a single instrument calibration data sets, may be stored on the memory 9 associated with the probe rather than with the instrument and that data read by the instrument to enable coating thickness measurements to be calculated. In particular, calibration data relating to measurement over two or more surfaces with a different surface profile may be stored on the memory associated with the probe.

In an alternative arrangement, sets of calibration data for a number of different probes may be stored on an instrument in association with an identifier for each probe. The individual identifier for each probe is stored on memory associated with the probe. When a particular probe is used with the instrument the instrument is able to read the identifier on the probe, and thus identify sets of calibration data relevant to that probe. A user may then select which set of calibration data to use according to the surface profile on which it is desired to made measurements.

The above embodiments are described by way of example only. Many variations are possible without departing from the scope of the disclosure as defined in the appended claims.

The invention claimed is:

1. A coating thickness measuring instrument comprising:
   a. an electromagnetic probe for measuring the thickness of a coating applied to a surface and producing an output relating to the measured thickness;
   b. a memory for storing calibration data;
   c. a processor arranged to process the output produced by the probe, together with calibration data stored by the memory, to produce a calibrated coating thickness measurement value;

d. at least two sets of calibration data, obtained by making measurements on at least two surfaces with known, different average surface profiles, pre-stored in the memory; and wherein each set of calibration data is associated with a different known average surface profile value, wherein the processor receives a user selection of the set of calibration data to be used by the processor according to the average surface profile of the surface on which a measurement is to be made, and wherein the processor determines the calibrated coating thickness measurement value based on the output relating to the measured thickness produced by the electromagnetic probe and the set of calibration data selected by the user.

2. A coating thickness measuring instrument as claimed in claim 1 wherein three or more sets of calibration data, each associated with a different known average surface profile, are pre-stored in the memory.

3. A coating thickness measuring instrument as claimed in claim 1 wherein the sets of calibration data are stored in a non-volatile memory.

4. A coating thickness measuring instrument as claimed in claim 1 wherein the user selection includes an average surface profile value from a range of values, each value associated with a different set of calibration data.

5. A coating thickness measuring instrument as claimed in claim 1 wherein the probe is removably mounted to the remainder of the instrument enabling different probes to be used with the instrument, and the memory stores at least two sets of calibration data, each set associated with a different known average surface profile, for use in calibration of measurements made by one probe and at least two different sets of calibration data, each set associated with a different known average surface profile, for use in calibration of measurements made by another probe.

6. A coating thickness measuring instrument as claimed in claim 1 wherein the probe is removably mounted to the remainder of the instrument and the memory storing sets of calibration data is mounted to the probe for removal from the remainder of the instrument with the probe.

7. The coating thickness measuring instrument of claim 1, further comprising an input device that enables a user to enter the user selection.

8. The coating thickness measuring instrument of claim 1, wherein the processor displays the calibrated coating thickness measurement value on a display device.

9. The coating thickness measuring instrument of claim 4, further comprising a display which displays the range of values.

10. A method of measuring the thickness of a coating on a surface with a known average surface profile comprising the steps of:
a. providing a coating thickness measuring instrument comprising:
   i. an electromagnetic probe for measuring the thickness of a coating applied to a surface and producing an output relating to the measured thickness;
   ii. a memory for storing calibration data;
   iii. a processor arranged to process the output produced by the probe, together with calibration data stored by the memory, to produce a calibrated coating thickness measurement value;
   iv. at least two sets of calibration data, obtained by making measurements on at least two surfaces with known, different average surface profiles, stored in the memory; and wherein each set of calibration data is associated with a different known average surface profile value, and wherein the processor receives a user selection of the set of calibration data to be used by the processor according to the average surface profile of the surface on which a measurement is to be made;
b. selecting from the average surface profile values stored by the instrument in association with sets of calibration data the average surface profile value closest to the known average surface profile, thereby to select a set of calibration data to be used by the instrument; and
c. using the instrument to measure coating thickness on the surface,
   wherein the processor receives the selection of the set of calibration data to be used by the instrument, and
   wherein the processor determines the calibrated coating thickness measurement value based on the output relating to the measured thickness produced by the electromagnetic probe and the selected set of calibration data.

11. The method of claim 10, wherein the processor displays the calibrated coating thickness measurement value on a display device.

12. A coating thickness measuring instrument comprising:
a. an electromagnetic probe for measuring a thickness of a coating applied to a surface and producing an output relating to the measured thickness;
b. a memory including pre-stored calibration data, the pre-stored calibration data including at least two sets of calibration data, each set associated with a different known average surface profile value; and
c. a processor adapted to process data stored in the memory, to produce a calibrated coating thickness measurement value,
   wherein the processor receives a user selection of a set of calibration data to be used by the processor, and
   wherein the processor determines the calibrated coating thickness measurement value based on the output relating to the measured thickness produced by the electromagnetic probe and the set of calibration data selected by the user.

13. The instrument of claim 12, wherein the selected set of calibration data used by the processor is selected according to an average surface profile of a surface on which a measurement is to be made.

14. The instrument of claim 12, wherein the processor displays the calibrated coating thickness measurement value on a display device.

15. The instrument of claim 13, wherein the selected set of calibration data used by the processor is selected responsive to a received user selection.

* * * * *